N. F. GREEN AND J. PETERKA.
DRINKING FOUNTAIN.
APPLICATION FILED SEPT. 4, 1919.
1,346,122.
Patented July 13, 1920.
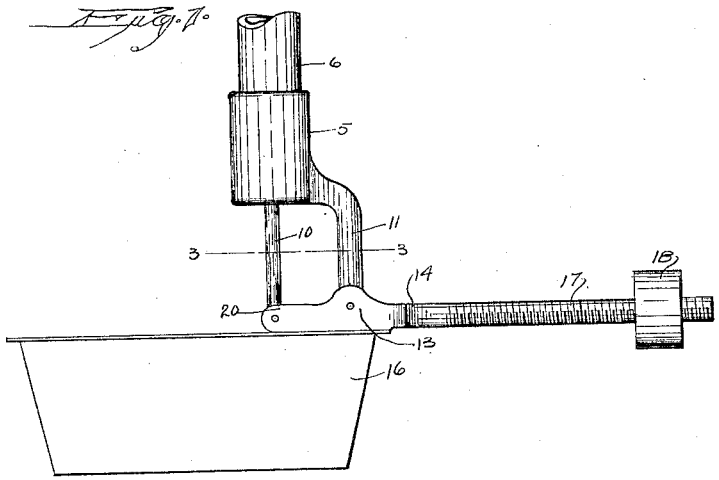
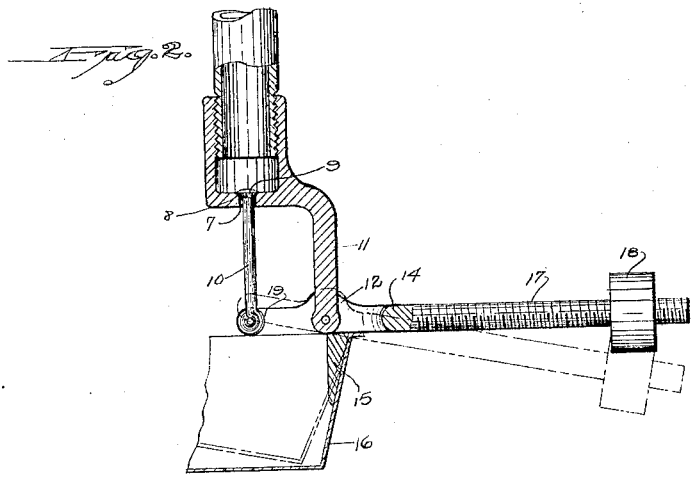
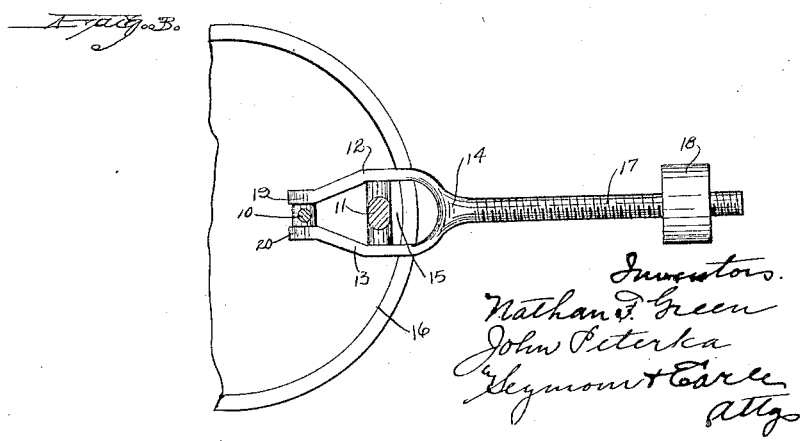

UNITED STATES PATENT OFFICE.

NATHAN F. GREEN, OF EAST HAVEN, AND JOHN PETERKA, OF SHELTON, CONNECTICUT.

DRINKING-FOUNTAIN.

1,346,122.   Specification of Letters Patent.   Patented July 13, 1920.

Application filed September 4, 1919. Serial No. 321,665.

*To all whom it may concern:*

Be it known that we, NATHAN F. GREEN, a citizen of the United States, and JOHN PETERKA, formerly a subject of the Emperor of Austria, residing, respectively, at East Haven, in the county of New Haven and State of Connecticut, and at Shelton, in the county of Fairfield and State of Connecticut, have invented a new and useful Improvement in Drinking-Fountains; and we do hereby declare the following, when taken in connection with the accompanying drawings and the characters of reference marked thereon, to be a full, clear, and exact description of the same, and which said drawings constitute part of this application, and represent, in—

Figure 1 a side view of a drinking fountain constructed in accordance with our invention.

Fig. 2 a vertical sectional view of the same.

Fig. 3 a sectional view on the line 3—3 of Fig. 1.

This invention relates to an improvement in drinking fountains, and while adapted for use for various purposes, is particularly intended as a drinking fountain for fowls, and more particularly to drinking fountains in which a counterbalanced pan is employed.

The object of this invention is to provide a simple device by which when water is reduced below a predetermined level the pan will be tilted and open a valve in the supply pipe and refill the pan, and the invention consists in a drinking fountain having certain details of construction as will be hereinafter described and particularly recited in the claims.

In carrying out our invention, we employ a nipple 5 adapted to be secured to the end of a water supply pipe 6. This nipple is formed in its lower end with a passage 7 forming a seat 8 for a head 9 on the valve stem 10. The nipple is formed with, or mounted upon the upper end of a post 11 which is pivotally connected between the fingers 12 and 13 of a lever 14 which is provided with a downwardly projecting lug 15 which may be secured to the inner wall of the pan 16. The outer end 17 of the lever is threaded, and upon it is turned a weight 18 which may be moved back and forth on the outer end of the lever. The lower end of the stem 10 is pivotally connected with the inner ends 19 and 20 of the fingers 12 and 13, and the stem is so proportioned that when the pan 16 stands in a horizontal position, the head 9 will enter the seat 8 and close the passage 7 so as to shut off the supply of water from the pipe 6. When the water is reduced below a predetermined level, the counterbalancing weight 18 will tilt the pan as indicated in broken lines in Fig. 2, thus lifting the stem 10 and opening the passage 7, permitting water to flow into the pan which as it becomes filled, will resume its horizontal position and draw the stem down so as to again close the passage 7 and shut off the supply of water.

This device is simple in arrangement, readily applied to any water supply pipe and is automatic in action.

We claim:—

1. The combination with a pan, of a lever formed with a downwardly projecting lug secured to the inner edge of the said pan, said lever formed with inwardly projecting fingers and an outwardly projecting arm, a counterbalance weight adjustably mounted on said arm, a nipple adapted to be secured to the lower end of a supply pipe, said nipple formed with a downwardly projecting post pivotally connected with said fingers at a point within the periphery of the pan, said nipple formed in its lower end with a passage, and a stem pivotally connected with the inner ends of the said fingers projecting upward through said passage and formed with a head adapted to open and close the said passage.

2. A drinking fountain comprising a pan, a lever secured to the upper edge of the pan, one end of the lever projecting inwardly beyond the edge of the pan, and the other end projecting outwardly therefrom, a counterbalance weight on said outwardly projecting end, a nipple adapted to be fixed to the end of a supply pipe and having a post which is pivotally connected with the inner end of said lever, said nipple formed on its lower end with a passage, and a stem connected with the inner end of the lever and extending through said passage and adapted at its upper end to close said passage.

In testimony whereof we have signed this specification in the presence of two subscribing witnesses.

NATHAN F. GREEN.
JOHN PETERKA.

Witnesses:
JOHN D. WIRTH,
SAM J. MAISEL.